Patented Mar. 19, 1940

2,194,115

UNITED STATES PATENT OFFICE 2,194,115

DECORATING GLASS ARTICLE

Wilbur R. Ferguson, Columbus, Ohio

No Drawing. Application September 18, 1936, Serial No. 101,501

1 Claim. (Cl. 91—70)

This invention relates to the art of decorating and is directed more particularly to the decoration of articles made of glassware, earthenware or like vitreous materials.

One of the primary objects of this invention is to provide an improved material for use in decorating articles of the above mentioned character, and to provide an improved method by which this material may be utilized.

Numerous other objects and advantages of this invention will become more apparent as the following description proceeds.

Before proceeding with a discussion of the instant invention, it might be noted that by the term "decorating" is meant the application of coloring material in any desired manner to the articles to be decorated. Thus, for example, in the decorating of drinking glasses it has become common practice to stripe or band the glasses with a suitable coloring material, or to completely color the glasses. Other forms of decorations have consisted in the application to glasses or the like of emblems, pictures, or printing, and the present invention is directed to an improvement in the art of effecting such decorating.

Heretofore in decorating vitreous articles such for example, as glassware, it has been the practice to utilize a vitreous coloring material which fuses at a relatively high temperature. This material has been applied to the glassware in any desired manner and then the glassware has been subjected to temperatures in the neighborhood of 1100° F., which effected fusing of the vitreous coloring material to the glassware. This fusing operation has been relatively expensive, first, because it has required the use of expensive apparatus, and secondly, because of the fuel required to raise the temperature of the glassware to the degree required. Under the teachings of the present invention, it is possible to apply the coloring material to glassware or the like and to effect a proper bond between the coloring material and the glassware at relatively low temperatures, such, for example, as 400° F.

A further disadvantage of the use of vitreous coloring materials is that these coloring materials are relatively expensive. Under the teachings of this invention a material is utilized which costs about one-fourth of vitreous coloring materials with the result that the present invention effects not only a saving in the cost of heating the glassware being colored, but also a saving in the initial cost of the material utilized.

It might be noted further that when vitreous coloring materials are utilized, there is a definite limit as to the colors which may be utilized since many pigments or dyes are destroyed by the high temperatures to which the glassware must be subjected to fuse the coloring material to the glassware. The base material, or the vehicle for the coloring material which is utilized under the teachings of this invention, will absorb any colors whatever and since the glassware need not be subjected to a high temperature after the coloring material has been applied to the same, there is practically no limit as to the colors which may be utilized.

The present invention utilizes as a vehicle for the pigment or dye which is to be used, a mixture comprising a vinyl resin, a suitable plasticizer and a solvent. These materials are mixed together in the proper proportions and then the coloring material which may be a pigment, a ceramic coloring agent or a dye is then added to the mixture. Vinyl resins are obtained by various processes from acetylene, natural gas and some organic gases. The resins contain the vinyl radical which has the formula $CH_2:CH$.

As an example of a mixture which has proven highly satisfactory in use, the following illustration may be given. Nine parts by weight of vinyl resin are ground to the desired size and then mixed with one part by weight of dibutyl phthalate which constitutes the plasticizer. After these two ingredients have been mixed, the proper amount of solvent, which may be ethyl acetate, is added to the mixture and then the coloring agent desired is added. Preferably a sufficient amount of solvent is utilized that the mixture will have the consistency of printers' ink, but it will be, of course, understood that the consistency of the mixture may vary depending upon the manner in which it is to be applied to the glassware, or the like.

It is a feature of the invention that the vinyl resin is preferably ground to a particular size. The larger particles are limited in size to the thickness of the film to be applied to the glassware. The finer particles of the vinyl resin are graded for maximum density of packing with the result that the mixture when ready for application to the glassware is of such a consistency that it will form on the glassware a film or coating of the thickness desired and in which the color will be entirely solid or uniform.

After the mixture has been prepared, the application of the same to the glassware may be effected in any one of several different ways. If the complete article is to be coated inside and out with the colored mixture, the article may be dipped in the mixture. If only the outside of the article is to be colored, this coloring may be effected by spraying the mixture on the article. If the article is to be striped or provided with colored bands, these bands may be applied by means of a brush or by any of the usual methods of applying colored bands to glassware. The mixture adapts itself to a printing operation in that a stamp formed of rubber or other resilient material, may be coated with the mixture and then this stamp caused to embrace the glass article to print or apply a design to the article. Finally, the mixture adapts itself for the use of the so-called "silk screen process", by which designs or the like are applied to glassware. In this process, the colored mixture is forced through a stencil and through silk onto the article to be decorated.

After the mixture has been applied to the article, the article may be immediately baked or heat treated, or it may be shipped, warehoused or stored and then baked at a later date. Obviously, if the entire article is covered with the mixture, a design may then later be superimposed on the film which covers the article, the article being baked either after each application of the material to the same or only once after the main color and the design have been applied.

In the baking operation, the article is placed in a suitable oven or the like and heated to the desired temperature and maintained at this temperature for a definite period of time. It has been found that if the article is maintained at a temperature of from 350° to 400° F. for a period of thirty to forty minutes, excellent results are obtained. The invention, however, is under no circumstances to be construed as limited to specific temperatures or the specific time interval above given, since good results are obtained over a wide range of temperatures and by subjecting the articles to these temperatures for different periods of time. In fact the temperature at which the article is baked and the length of time during which the article is subjected to the baking operation will be varied dependent upon the thickness of the glass or article and the thickness of the film being applied to the same. In any event, the article is heated to a temperature lower than that required to fuse vitreous colors, the lowest temperature for this purpose being approximately 900° F.

From the above it will be apparent that the invention provides an improved material for use in decorating articles and an improved material for use in the method. The material which is utilized acts as a reenforcement for the article to which it is applied so that, for example, in the case of drinking glasses, these glasses can be made of extremely thin glass since when they are coated with the improved coloring material, they are so reenforced that they easily withstand breakage. Obviously, the use of thinner glass reduces the amount of glass used, and also reduces the weight of the articles, thus lowering freight costs and the like. It might be noted that the amount of glass which is saved will approximately offset the cost of applying vinyl film.

It might be noted that the mixture of the vinyl resin, the plasticizer, and the solvent is substantially colorless and since it is this mixture rather than the dye or pigment added to the same which produces the reenforcing film, it will be obvious that, if desired, the coloring pigments or dyes may be omitted and the mixture applied to glassware in its colorless state. Thus thin crystal-clear glassware may be produced by merely coating the same with a colorless mixture of a vinyl resin, a plasticizer and a solvent.

The film formed on the glass articles by the improved clear or colored mixture resists acids, alkalies, 188 proof alcohol and all conditions normally met when the articles are exposed to the weather. Additionally, the film resists sterilization so that the articles may be sterilized without damage to the coating.

As previously mentioned, the improved mixture may be colored by ceramic coloring agents such as oxides, stains, pigments or dyes and may be given any color desired, even the most delicate tints, since the coloring material is not subjected to high temperatures which destroy so many colors.

As previously mentioned, the vinyl resin may be utilized as a coating for an article to strengthen the same. When so used, it acts as a base on which a design or the like may be printed either by utilizing another layer of resin or by merely utilizing a suitable dye or coloring agent. The vinyl resin when so used has the capacity of absorbing the coloring material so that the same will be properly applied to the article.

While the invention will find particular utility in the coating or decorating of glassware, it might be noted that a vinyl solution may be applied to china, porcelain or the like to either reinforce the same or for decorative purposes.

While one example of the improved mixture has been given in detail, and while several ways of practicing the method have been described, it is to be understood that the description is not definitive of the limtis of the inventive idea but is merely for the purposes of illustration. The right is therefore reserved to make such changes in the nature of the mixture and the practicing of the method as will fall within the purview of the attached claim.

What I claim as my invention is:

In the method of applying a reenforcing film to an article of glassware, those steps which consist in grinding a vinyl resin so that the largest particles thereof are of the thickness of film desired while particles of substantially lesser size are graded for maximum density of packing, mixing a plasticizer and a solvent with the ground vinyl resin, applying the mixture thus formed to the article of glassware, and then heating the article of glassware sufficiently to cause the mixture to adhere to the glass.

WILBUR R. FERGUSON.